United States Patent
Lim et al.

(10) Patent No.: US 12,132,215 B2
(45) Date of Patent: *Oct. 29, 2024

(54) BATTERY CELL AND BATTERY MODULE INCLUDING THE SAME

(71) Applicant: LG Energy Solution, Ltd., Seoul (KR)

(72) Inventors: Hun-Hee Lim, Daejeon (KR); Sang-Hun Kim, Daejeon (KR); Soo-Ji Hwang, Daejeon (KR); Min-Hyeong Kang, Daejeon (KR); Eun-Suk Park, Daejeon (KR); Hyung-Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/021,439

(22) PCT Filed: Jan. 11, 2022

(86) PCT No.: PCT/KR2022/000494
§ 371 (c)(1),
(2) Date: Feb. 15, 2023

(87) PCT Pub. No.: WO2022/149959
PCT Pub. Date: Jul. 14, 2022

(65) Prior Publication Data
US 2023/0327247 A1    Oct. 12, 2023

(30) Foreign Application Priority Data
Jan. 11, 2021 (KR) .......... 10-2021-0003184

(51) Int. Cl.
*H01M 50/184* (2021.01)
*H01M 50/105* (2021.01)
(Continued)

(52) U.S. Cl.
CPC ....... *H01M 50/184* (2021.01); *H01M 50/105* (2021.01); *H01M 50/133* (2021.01);
(Continued)

(58) Field of Classification Search
CPC ............. H01M 50/178; H01M 50/105; H01M 50/394; H01M 50/133; H01M 50/184;
(Continued)

(56) References Cited

U.S. PATENT DOCUMENTS

2006/0051658 A1    3/2006    Otohata et al.
2006/0238162 A1    10/2006   Cheon et al.
(Continued)

FOREIGN PATENT DOCUMENTS

CN    1653629 A    8/2005
CN    1855600 A    11/2006
(Continued)

OTHER PUBLICATIONS

Machine translation of Korean Patent Publication No. 2013/0014253, published Feb. 7, 2013. (Year: 2013).*
(Continued)

*Primary Examiner* — Stewart A Fraser
*Assistant Examiner* — Lilia Nedialkova
(74) *Attorney, Agent, or Firm* — Lerner David LLP

(57) ABSTRACT

Disclosed is a battery cell, which includes a battery case having an accommodation portion in which an electrode assembly is mounted, and a sealing portion formed by sealing an outer periphery thereof by heat fusion; an electrode lead electrically connected to an electrode tab included in the electrode assembly and protruding out of the battery case via the sealing portion; and a lead film located at a portion corresponding to the sealing portion in at least one of an upper portion and a lower portion of the electrode lead, wherein the lead film has a dented portion recessed toward (Continued)

an inside of the battery case, and the dented portion is opened toward an outside of the battery case.

20 Claims, 7 Drawing Sheets

(51) Int. Cl.
  *H01M 50/133* (2021.01)
  *H01M 50/178* (2021.01)
  *H01M 50/534* (2021.01)
  *H01M 50/538* (2021.01)
(52) U.S. Cl.
  CPC ....... *H01M 50/178* (2021.01); *H01M 50/534* (2021.01); *H01M 50/538* (2021.01)
(58) Field of Classification Search
  CPC ............. H01M 50/193; H01M 50/534; H01M 50/538; H01M 50/548; H01M 50/557; Y02E 60/10
  See application file for complete search history.

(56) References Cited

U.S. PATENT DOCUMENTS

| | | |
|---|---|---|
| 2009/0081542 A1 | 3/2009 | Yageta et al. |
| 2011/0033769 A1 | 2/2011 | Huang et al. |
| 2011/0104527 A1 | 5/2011 | Choi et al. |
| 2014/0120387 A1 | 5/2014 | Kinuta et al. |
| 2014/0199581 A1 | 7/2014 | Ryu et al. |
| 2016/0315301 A1 | 10/2016 | Kim et al. |
| 2017/0149024 A1* | 5/2017 | Park ................... H01M 50/531 |
| 2018/0114964 A1 | 4/2018 | Kim et al. |
| 2018/0219247 A1 | 8/2018 | Park |
| 2023/0084670 A1 | 3/2023 | Lim et al. |
| 2023/0178830 A1 | 6/2023 | Lim et al. |

FOREIGN PATENT DOCUMENTS

| | | |
|---|---|---|
| CN | 102280604 A | 12/2011 |
| CN | 106067525 A | 11/2016 |
| CN | 107925033 A | 4/2018 |
| EP | 3660941 A1 | 6/2020 |
| JP | 2001273884 A | 10/2001 |
| JP | 2006-185708 A | 7/2006 |
| JP | 2006310308 A | 11/2006 |
| JP | 2007-311163 A | 11/2007 |
| JP | 2009-146812 A | 7/2009 |
| JP | 201289532 A | 5/2012 |
| JP | 201312468 A | 1/2013 |
| JP | 2014212034 A | 11/2014 |
| JP | 2015510240 A | 4/2015 |
| JP | 2017103164 A | 6/2017 |
| JP | 2018525804 A | 9/2018 |
| KR | 100684724 B1 | 2/2007 |
| KR | 100944987 B1 | 3/2010 |
| KR | 20120059548 A | 6/2012 |
| KR | 20130014253 A | 2/2013 |
| KR | 2014-0087773 A | 7/2014 |
| KR | 101547403 B1 | 8/2015 |
| KR | 20160031779 A | 3/2016 |
| KR | 20160111614 A | 9/2016 |
| KR | 20160126157 A | 11/2016 |
| KR | 20170027150 A | 3/2017 |
| KR | 20180090100 A | 8/2018 |
| KR | 20180092819 A | 8/2018 |
| KR | 20190022196 A | 3/2019 |
| WO | 2013146803 A1 | 10/2013 |
| WO | 2018-052042 A1 | 3/2018 |
| WO | 2020-184689 A1 | 9/2020 |
| WO | 2022-098063 A1 | 5/2022 |
| WO | 2022-149960 A1 | 7/2022 |

OTHER PUBLICATIONS

International Search Report for Application No. PCT/KR2022/000494 mailed Apr. 19, 2022, pp. 1-3.

Search Report dated Sep. 18, 2023 from the Office Action for Chinese Application No. 202280002618.4 issued Sep. 19, 2023, 3 pages. [See p. 1-2, categorizing the cited references].

* cited by examiner (a)

(b)

(a)

(b)

(a)

(b)

(a)

(b)

BATTERY CELL AND BATTERY MODULE INCLUDING THE SAME

CROSS-REFERENCE TO RELATED APPLICATIONS

The present application is a national stage entry under 35 U.S.C. § 371 of International Application No. PCT/KR2022/000494, filed on Jan. 11, 2022, which claims priority to Korean Patent Application No. 10-2021-0003184, filed on Jan. 11, 2021, the entire disclosures of which are hereby incorporated by reference herein in their entireties.

TECHNICAL FIELD

The present disclosure relates to a battery cell and a battery module including the same, and more particularly, to a battery cell with improved external emission of gas generated inside the battery cell, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy modification.

FIG. 1 is a top view showing a conventional battery cell. FIG. 2 is a cross-sectional view, taken along the axis a-a' of FIG. 1. Referring to FIGS. 1 and 2, a conventional battery cell 10 includes a battery case 20 having an accommodation portion 21 in which a battery assembly 11 is mounted, and a sealing portion 25 formed by sealing an outer periphery thereof by heat fusion. Here, the battery cell 10 includes an electrode lead 30 protruding out of the battery case 20 via the sealing portion 25, and a lead film 40 is located between upper and lower portions of the electrode lead 30 and the sealing portion 25.

However, as the energy density of the battery cell increases in recent years, there is a problem that the amount of gas generated inside the battery cell also increases. In the case of the conventional battery cell 10, a component capable of discharging the gas generated inside the battery cell is not included, so a venting may occur in the battery cell due to gas generation. In addition, moisture may penetrate into the battery cell damaged by the venting, which may cause side reactions, and there is a problem that battery performance deteriorates and additional gas is generated. Accordingly, there is an increasing need to develop a battery cell with improved external emission of gas generated inside the battery cell.

DISCLOSURE

Technical Problem

The present disclosure is designed to solve the problems of the related art, and therefore the present disclosure is directed to providing a battery cell with improved external emission of gas generated inside the battery cell, and a battery module including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery cell, comprising: a battery case having an accommodation portion in which an electrode assembly is mounted, and a sealing portion formed by sealing an outer periphery thereof by heat fusion; an electrode lead electrically connected to an electrode tab included in the electrode assembly and protruding out of the battery case via the sealing portion; and a lead film located at a portion corresponding to the sealing portion in at least one of an upper portion and a lower portion of the electrode lead, wherein the lead film has a dented portion recessed toward an inside of the battery case, and the dented portion is opened toward an outside of the battery case.

Inner surfaces of the dented portion may be closed based on a protruding direction of the electrode lead.

The battery cell may further comprise an inner layer configured to cover at least one surface of inner surfaces of the dented portion of the lead film.

A material of the inner layer may have a higher melting point compared to a material of the lead film and may not react with an electrolytic solution.

The lead film may contain a polyolefin-based material.

The inner layer may contain at least one of polyolefin-based materials, fluorine-based materials and porous ceramic-based materials.

The dented portion may be located over the electrode lead.

The lead film may have a length greater than a width of the electrode lead.

The dented portion may be located between an end of the electrode lead and an end of the lead film.

The dented portion may include a first dented portion and a second dented portion, the first dented portion may extend along a protruding direction of the electrode lead, and the second dented portion may extend along a longitudinal direction of the sealing portion.

The lead film may have a width greater than a width of the sealing portion and smaller than a length of the electrode lead.

The second dented portion may be located between an end of the sealing portion and an end of the lead film.

The lead film may include a first lead film and a second lead film, the first lead film may be located at an upper portion of the electrode lead, and the second lead film may be located at a lower portion of the electrode lead.

The electrode lead may be located between the first lead film and the second lead film, and the first lead film and the second lead film may be connected to each other.

The dented portion may be located in at least one of the first lead film and the second lead film.

An end of the dented portion recessed into the lead film may be located inner than an inner surface of the battery case.

An end of the dented portion opened toward the outside of the battery case may be located outer than an outer surface of the battery case.

Based on a protruding direction of the electrode lead, a width of the lead film surrounding a rear surface of the dented portion may be 2 mm or more.

A thickness of the lead film surrounding an upper surface of the dented portion may be 100 μm to 300 μm.

The lead film may have gas permeability of 20 Barrer to 60 Barrer at 60° C.

The lead film may have a moisture penetration amount of 0.02 g to 0.2 g for 10 years at 25° C., 50% RH.

In another aspect of the present disclosure, there is also provided a battery module, comprising the battery cell described above.

Advantageous Effects

According to the embodiments, the present disclosure provides a battery cell including an electrode lead to which a lead film having a dented portion recessed toward the inside of the battery case and opened toward the outside of the battery case is attached, and a battery module including the same, so it is possible to improve the external emission of gas generated inside the battery cell.

The effect of the present disclosure is not limited to the above effects, and the effects not mentioned here will be clearly understood by those skilled in the art from this specification and the accompanying drawings.

BEST MODE

Figure 1:
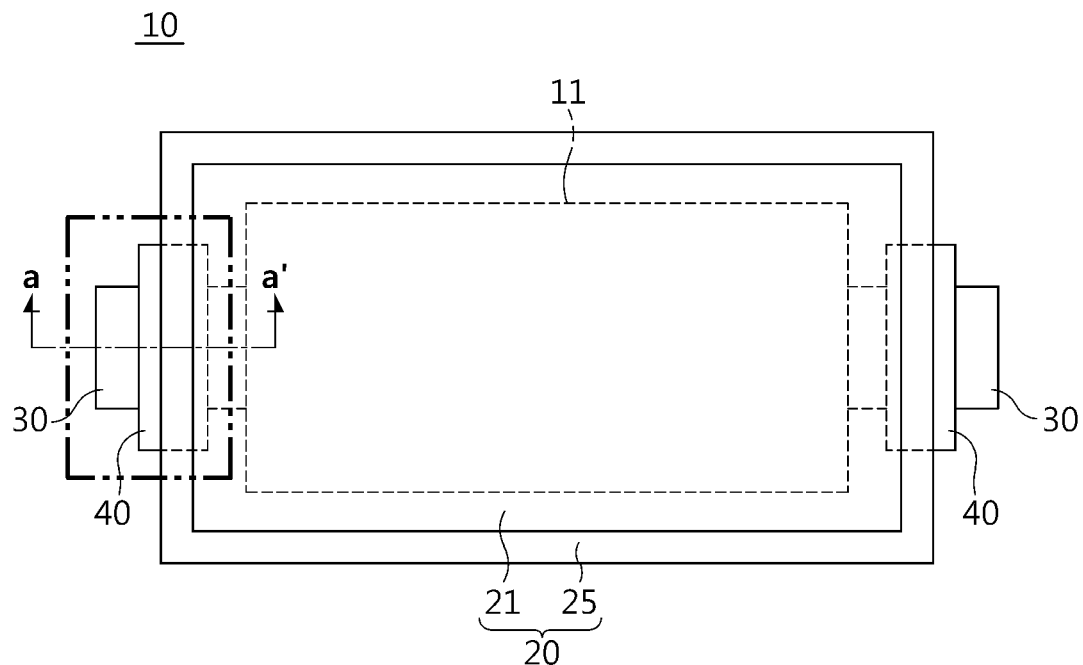
FIG. 1 is a top view showing a conventional battery cell.
Figure 2:
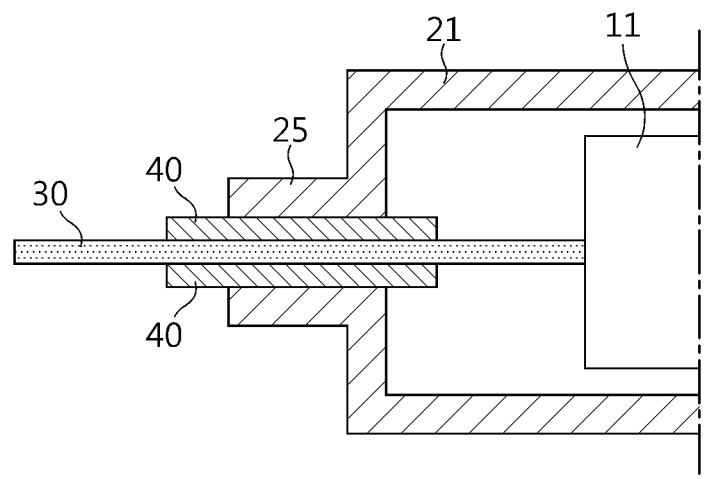
FIG. 2 is a cross-sectional view, taken along the axis a-a' of FIG. 1.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

Hereinafter, a pouch battery cell 100 according to an embodiment of the present disclosure will be described. However, here, the description will be made based on one side surface of both side surfaces of the pouch battery cell 100, but it is not necessarily limited thereto, and the same or similar contents may be described in the case of the other side surface.

Figure 3:
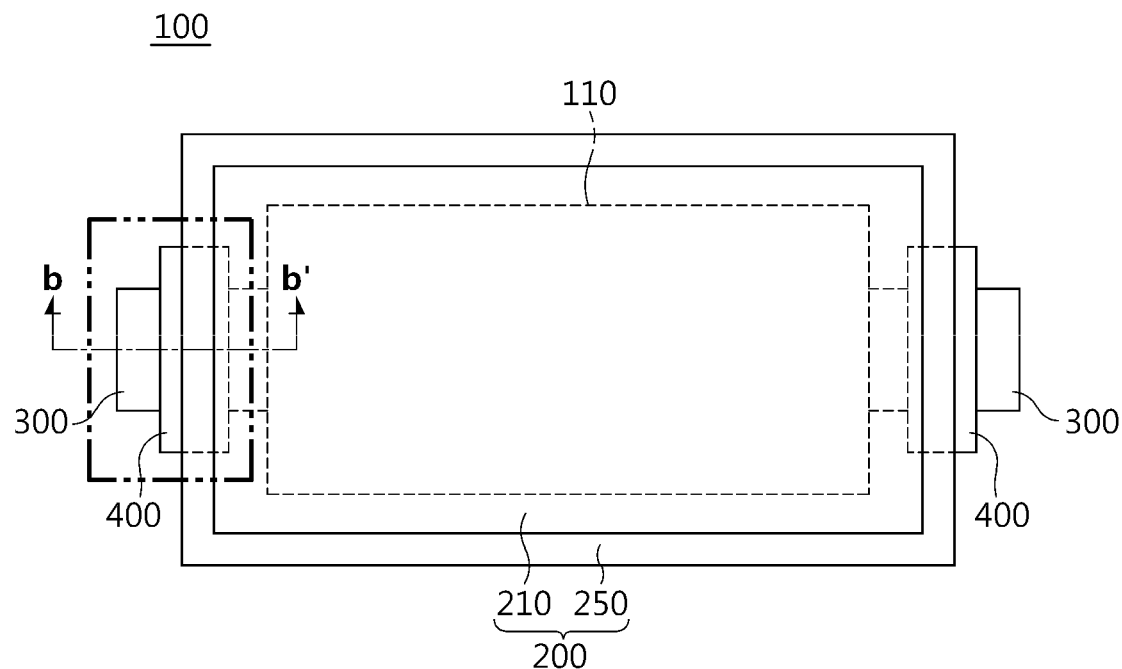
FIG. 3 is a top view showing a battery cell according to this embodiment.

FIG. 3 is a top view showing a battery cell according to this embodiment.

Referring to FIG. 3, the battery cell 100 according to this embodiment includes a battery case 200, an electrode lead 300, and a lead film 400.

The battery case 200 includes an accommodation portion 210 in which an electrode assembly 110 is mounted, and a sealing portion 250 formed by sealing an outer periphery thereof by heat fusion. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

Also, the electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

Hereinafter, the electrode lead 300 and the lead film 400 will be mainly described.

Figure 4:
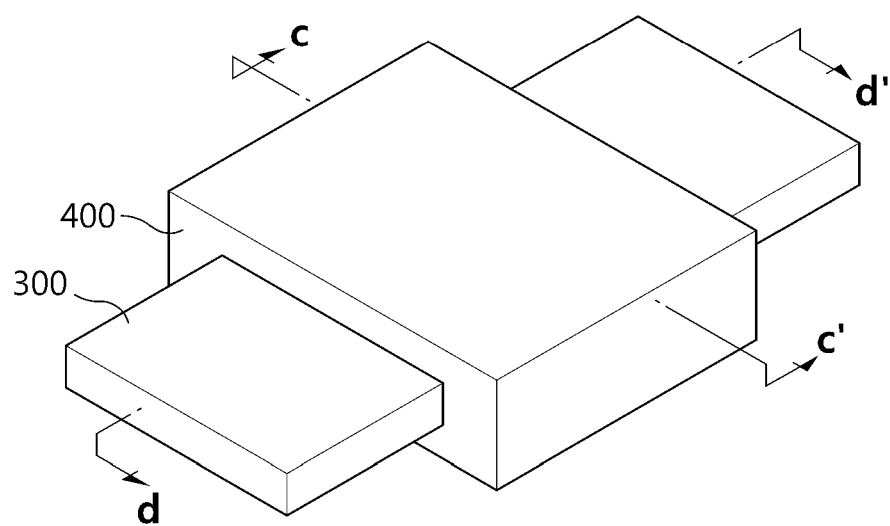
FIG. 4 is a perspective view showing an electrode lead included in the battery cell of FIG. 3.

FIG. 4 is a perspective view showing an electrode lead included in the battery cell of FIG. 3.

Referring to FIGS. 3 and 4, the electrode lead 300 is electrically connected to an electrode tab (not shown) included in the electrode assembly 110, and protrudes out of the battery case 200 via the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during heat fusion.

Figure 5:
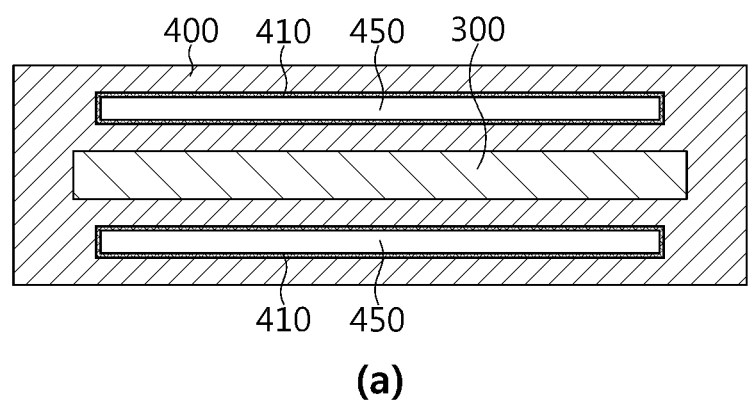
FIG. 5 is a cross-sectional view, taken along the axis c-c' of FIG. 4.
Figure 5:
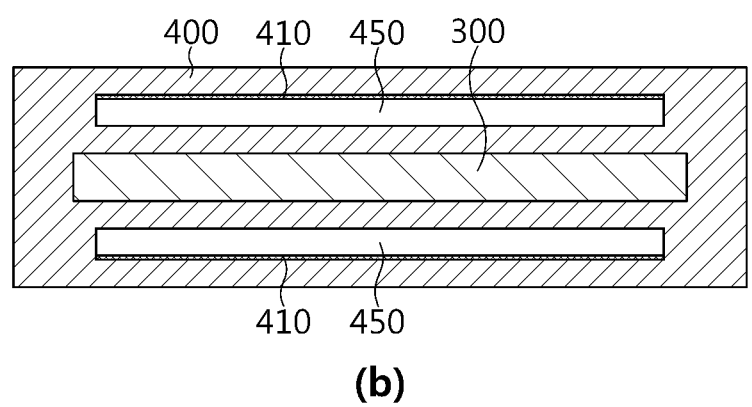
Figure 6:
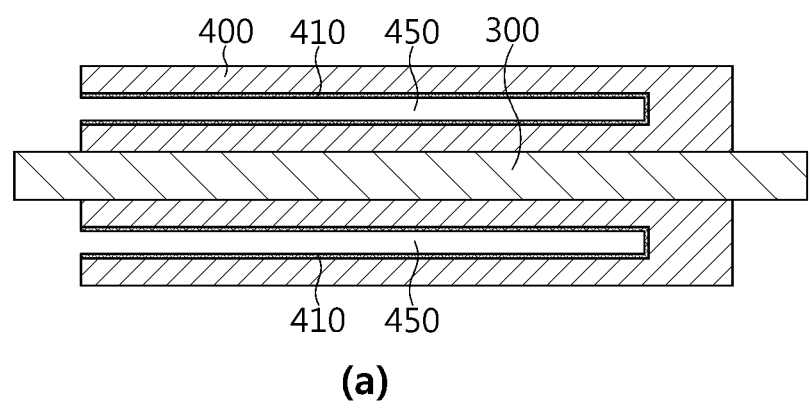
FIG. 6 is a cross-sectional view, taken along the axis d-d' of FIG. 4.
Figure 6:
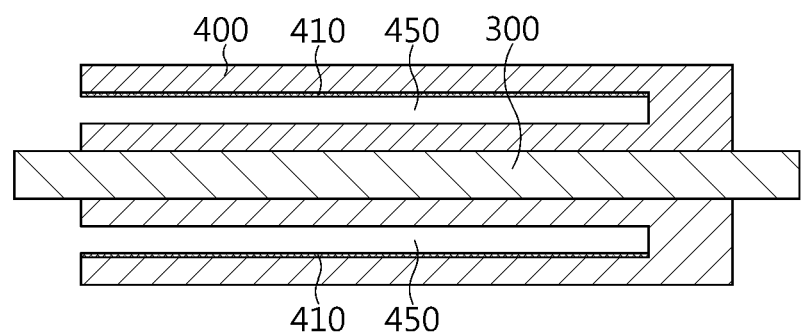

FIG. 5 is a cross-sectional view, taken along the axis c-c' of FIG. 4. FIG. 6 is a cross-sectional view, taken along the axis d-d' of FIG. 4.

Referring to FIGS. 5 and 6, the lead film 400 has a dented portion 450 recessed toward the inside of the battery case 200, and the dented portion 450 is opened toward the outside of the battery case 200. Also, the inner surface of the dented portion 450 may be closed based on the protruding direction of the electrode lead 300.

Accordingly, in the lead film 400, the gas generated inside the battery case 200 may be discharged to the dented portion 450 due to the pressure difference between the inside and the outside of the dented portion 450, and the gas introduced into the dented portion 450 may be discharged toward the outside. In addition, since the dented portion 450 of the lead film 400 is opened toward the outside, the dented portion 450 may not be exposed to the electrolytic solution inside the battery case 200, and the airtightness and durability of the pouch may be secured. In addition, the lead film 400 may maximize the area for gas penetration by the dented portion 450 and thus discharge a large amount of gas.

In addition, referring to FIGS. 5 and 6, the lead film 400 may further include an inner layer 410 covering at least one of the inner surfaces of the dented portion 450.

For example, referring to FIGS. 5(a) and 6(a), the inner layer 410 in the dented portion 450 may cover the entire surface of the lead film 400. That is, the inner layer 410 may be formed on the entire inner surface of the dented portion 450 exposed for the opened surface.

Accordingly, even if the lead film 400 is heat-fused together with the sealing portion 250 in a state of being located in at least one of the upper and lower portions of the electrode lead 300, the dented portion 450 may be preserved in a non-heat-fused state by the inner layer 410.

As another example, referring to FIGS. 5(b) and 6(b), the inner layer 410 may cover an upper surface or a lower surface among the inner surfaces of the dented portion 450. That is, the dented portion 450 may have an inner layer 410 formed on at least one of the upper and lower surfaces facing each other.

Accordingly, while the lead film 400 minimizes the inner layer 410 formed in the dented portion 450, the dented portion 450 may be preserved in a non-heat-fused state by the inner layer 410. In addition, the manufacturing process may be simplified and the cost may be reduced.

More specifically, the inner layer 410 may be made of a material having a higher melting point compared to the material constituting the lead film 400. In addition, the inner layer 410 may be made of a material that does not react with the electrolytic solution contained in the battery case 200. Accordingly, since the inner layer 410 is made of the above-described material, the inner layer 410 does not separately react with the electrolytic solution and does not cause heat fusion, thermal deformation, or the like in the high-temperature heat fusion process, so that the dented portion 450 may be kept blank. In addition, the gas generated in the battery case 200 may be easily discharged to the outside.

In one embodiment of the present disclosure, the thickness of the inner layer 410 may be 100 μm or less.

In one embodiment of the present disclosure, the gas permeability of the inner layer 410 may be 40 Barrer or more. For example, the carbon dioxide permeability of the inner layer 410 may satisfy the above range.

For example, the lead film 400 may contain a polyolefin-based material, and the inner layer 410 may include at least one of polyolefin-based materials, fluorine-based materials, and porous ceramic-based materials. For example, the inner layer 410 may include at least one of polyolefin-based materials, fluorine-based materials, and porous ceramic-based materials that satisfies the above gas permeability value. The polyolefin-based material may include at least one material selected from the group consisting of polypropylene, polyethylene, and polyvinyl difluoride (PVDF). The fluorine-based material may include at least one material selected from the group consisting of polytetrafluoroethylene and polyvinylidene fluoride. In addition, the inner layer 410 may include a getter material, so that gas permeability may be increased while water permeability may be minimized. As an example, the getter material may be calcium oxide (CaO), barium oxide (BaO), lithium chloride (LiCl), silica ($SiO_2$), or the like, and any material reacting with water ($H_2O$) can be used without being limited thereto.

The inner layer 410 may have an adhesive material between the lead film 400 and the inner layer 410 or may be extruded together with the lead film 400 and adhered to the lead film 400. The adhesive material may include an acryl-based material. In particular, when the inner layer 410 is extruded together with the lead film 400, the gas permeability of the inner layer 410 may be 40 Barrer or more.

Referring to FIGS. 4 to 6, the lead film 400 may include a first lead film and a second lead film, the first lead film may be located at an upper portion of the electrode lead 300, and the second lead film may be located at a lower portion of the electrode lead 300. At this time, the electrode lead 300 may be heat-fused together with the sealing portion 250 in a state of being located between the first lead film and the second lead film, so that the first lead film and the second lead film may be connected to each other.

Accordingly, the lead film 400 may prevent the side surface of the electrode lead 300 from being exposed to the outside, while improving the sealing properties of the sealing portion 250 and the electrode lead 300.

For example, in the lead film 400, the dented portion 450 may be located in at least one of the first lead film and the second lead film. More specifically, in the lead film 400, the dented portion 450 may be formed in the first lead film or the second lead film based on the electrode lead 300, or the dented portion 450 may be formed on both the first lead film and the second lead film based on the electrode lead 300. However, the number of the dented portion 450 is not limited to the above, and the lead film 400 may be formed in an appropriate number.

Accordingly, by adjusting the number of the dented portions 450 formed in the lead film 400, the durability and airtightness of the lead film 400 may be controlled. In addition, by minimizing the number of the dented portion 450 as necessary, it is possible to simplify the manufacturing process and reduce the cost.

Figure 7:
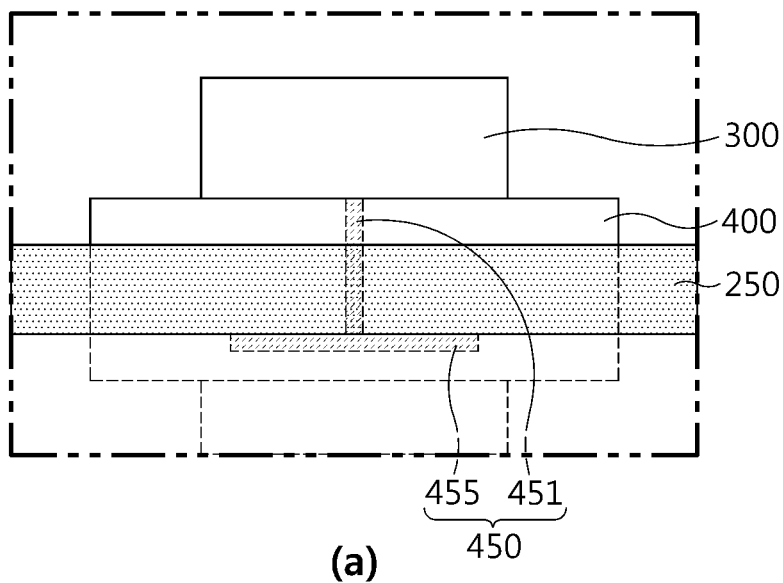
FIG. 7 is an enlarged view showing the electrode lead in the battery cell of FIG. 3.
Figure 7:
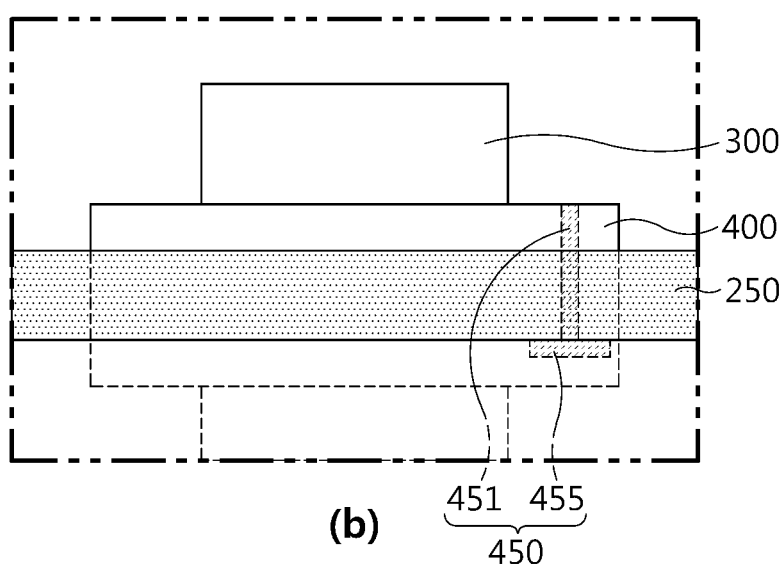
Figure 8:
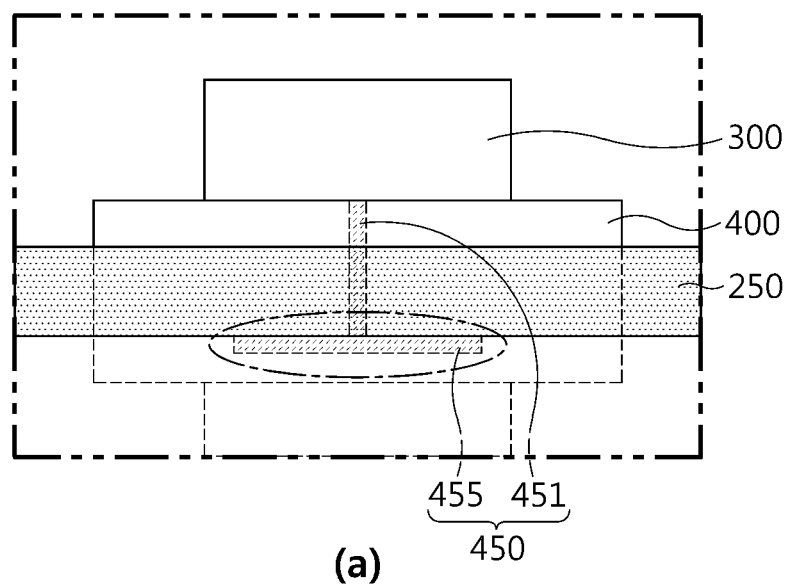
FIG. 8 is an enlarged view showing the electrode lead according to a location of the sealing portion in (a) of FIG. 7.
Figure 8:
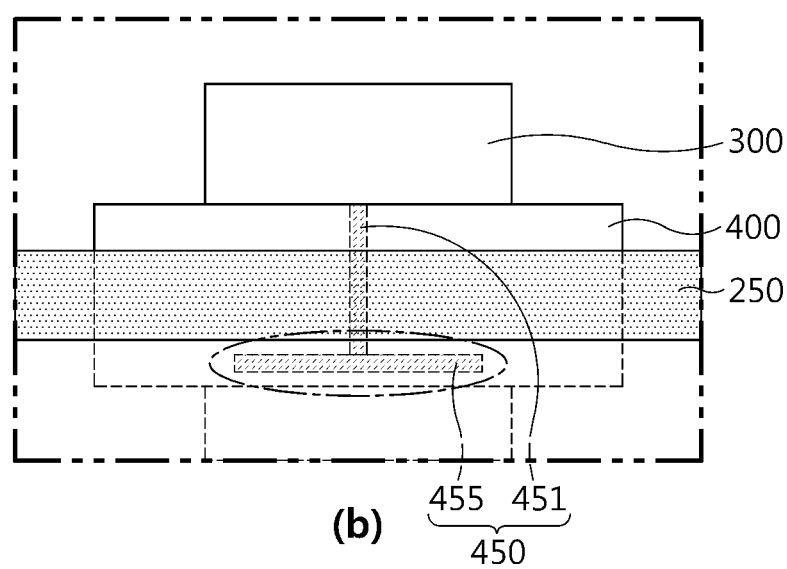

FIG. 7 is an enlarged view showing the electrode lead in the battery cell of FIG. 3. FIG. 8 is an enlarged view showing the electrode lead according to a location of the sealing portion in (a) of FIG. 7.

Referring to FIG. 7, in the lead film 400, the dented portion 450 may be formed at various positions with respect to the electrode lead 300.

For example, as shown in FIG. 7(a), in the lead film 400, the dented portion 450 may be located over the electrode lead 300. More specifically, the dented portion 450 may be formed at a position corresponding to the center of the electrode lead 300.

As another example, as shown in FIG. 7(b), the length of the lead film 400 may be greater than the width of the electrode lead 300, and the dented portion 450 may be located between the end of the electrode lead 300 and the end of the lead film 400. Here, the length of the lead film 400 means a maximum value of the distance between one end and the other end of the lead film 400 in a direction orthogonal to the protruding direction of the electrode lead 300, and the width of the electrode lead 300 means a maximum value of the distance between one end and the other end of the electrode lead 300 in a direction orthogonal to the protruding direction of the electrode lead 300. In other words, in the lead film 400, the dented portion 450 may be formed at a position avoiding the electrode lead 300. However, the position of the dented portion 450 is not limited to the above, and the dented portion 450 may be formed at an appropriate position within the lead film 400.

Accordingly, by adjusting the position of the dented portion 450 formed in the lead film 400, the durability and airtightness of the lead film 400 may be controlled. In addition, if necessary, by adjusting the size of the dented portion 450 according to the position of the dented portion 450, it is possible to simplify the manufacturing process and reduce cost. Referring to FIG. 7, in the lead film 400, the dented portion 450 may be formed in various shapes.

For example, the dented portion 450 may include a first dented portion 451 and a second dented portion 455, where the first dented portion 451 may extend along the protruding direction of the electrode lead 300 and the second dented portion 455 may extend along the longitudinal direction of the sealing portion 250. Here, the longitudinal direction of the sealing portion 250 refers to a direction perpendicular to the protruding direction of the electrode lead 300.

Here, the width of the lead film 400 may be greater than the width of the sealing portion 250 and may be smaller than the length of the electrode lead 300. Here, the width of the lead film 400 means a maximum value of the distance between one end and the other end of the lead film in the protruding direction of the electrode lead 300. The width of the sealing portion 250 means a maximum value of the distance between one end and the other end of the sealing portion 250 in the protruding direction of the electrode lead 300. The length of the electrode lead 300 means a maximum value of the distance between one end and the other end of the electrode lead 300 in the protruding direction of the electrode lead 300. At this time, the second dented portion 455 may be located between the end of the sealing portion 250 and the end of the lead film 400. However, the shape of the dented portion 450 is not limited to the above, and the dented portion 450 may be formed in an appropriate shape within the lead film 400.

Accordingly, by adjusting the shape of the dented portion 450 formed in the lead film 400, the durability and airtightness of the lead film 400 may be controlled. In addition, by changing the shape of the dented portion 450 as necessary, it is possible to simplify the manufacturing process and reduce cost.

Referring to FIG. 8, in the lead film 400, the end of the dented portion 450 is opened toward the outside may be formed adjacent to the end of the lead film 400, the end of the dented portion 450 recessed toward the inside may be located between the end of the sealing portion 250 and the end of the lead film 400. In addition, the end of the dented portion 450 recessed toward the inside may be spaced apart from the end of the sealing portion 250 by a predetermined distance, or may be located adjacent thereto.

As an example, comparing FIGS. 8(a) and 8(b), even if the position of the sealing portion 250 in contact with the lead film 400 is changed, it may be found that there is no influence applied to the end of the dented portion 450 recessed toward the inside.

Accordingly, in this embodiment, within the error range according to the positions of the lead film 400 and the sealing portion 250 generated during the heat fusion process, the area in which the end of the dented portion 450 recessed toward the inside is located at an inside with respect to the battery case 200 may be uniformly maintained, and the area in which the gas in the battery case 200 may be introduced into the dented portion 450 and discharged to the outside may also be maintained uniformly. Accordingly, there is an advantage that the gas exhaust effect by the dented portion 450 may also be maintained.

Figure 9:
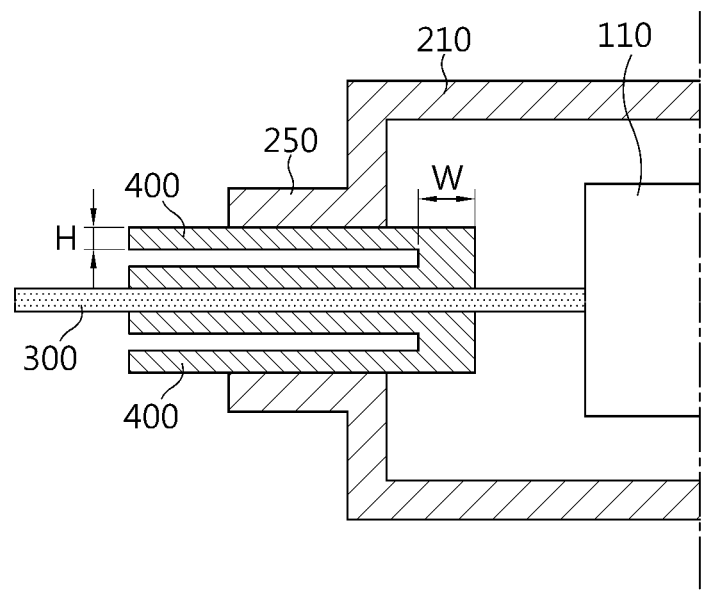
FIG. 9 is a cross-sectional view, taken along the axis b-b' of FIG. 3.

FIG. 9 is a cross-sectional view, taken along the axis b-b' of FIG. 3.

Referring to FIG. 9, the end of the dented portion 450 recessed into the lead film 400 may be located inner than the inner surface of the battery case 200. Here, the inner surface of the battery case 200 means an end of the sealing portion 250 of the battery case 200 at the inner side of the battery. In addition, the end of the dented portion 450 opened toward the outside of the battery case 200 may be located outer than the outer surface of the battery case 200. Here, the outer surface of the battery case 200 means an end of the sealing portion 250 of the battery case 200 at the outer side of the battery.

Accordingly, the lead film 400 may maximize the area of the dented portion 450 and discharge a large amount of gas.

Referring to FIG. 9, the thickness H of the lead film 400 surrounding the upper surface of the dented portion 450 may be 100 μm to 300 μm, or 100 μm to 200 μm. If the thickness H of the lead film 400 surrounding the upper surface of the dented portion 450 satisfies the above range, the gas inside the battery case 200 may be more easily discharged to the outside.

Referring to FIG. 9, based on the protruding direction of the electrode lead 300, the width W of the lead film 400 surrounding the rear surface of the dented portion 450 may be 2 mm or more, or 2 mm to 3 mm. Here, the width of the lead film 400 surrounding the rear surface of the dented portion 450 means a maximum value of the distance between the recessed end of the dented portion 450 and the inner end of the battery case 200 of the lead film 400. If the width W of the lead film 400 surrounding the rear surface of the dented portion 450 satisfies the above range, the phenomenon that the lead film 400 is torn while the gas generated inside the battery case 200 is discharged to the outside may be easily prevented.

Figure 10:
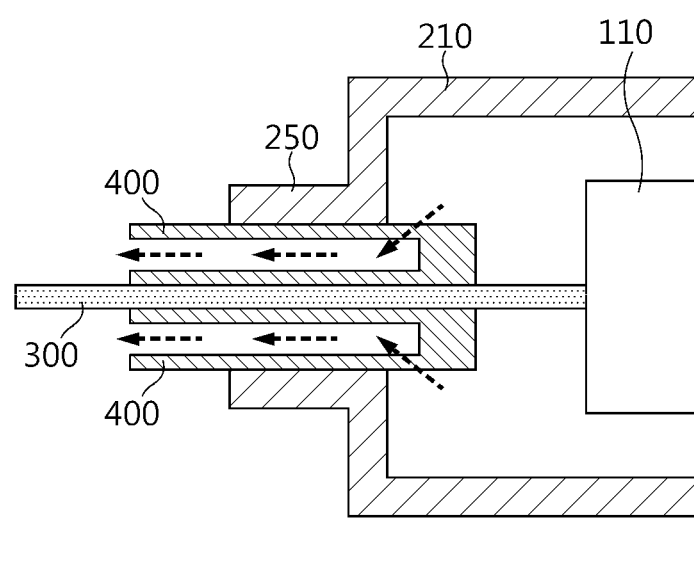
FIG. 10 is a diagram showing the flow of gas generated inside the battery cell and discharged to the outside in FIG. 9.

FIG. 10 is a diagram showing the flow of gas generated inside the battery cell and discharged to the outside in FIG. 9.

Referring to FIG. 10, the gas generated inside the battery cell 100 may be discharged toward the dented portion 450 of the lead film 400. Here, the internal pressure of the battery cell 100 is higher than the internal pressure of the dented portion 450, and the resulting pressure difference may act as a driving force of the gas. Here, since the dented portion 450 is opened toward the outside, the pressure inside the dented portion 450 may be the same as the pressure of the outside.

Accordingly, the gas generated inside the battery cell 100 may be discharged toward the dented portion 450, and the gas introduced into the dented portion 450 may be easily discharged toward the outside. In addition, the amount of gas generated inside the battery cell 100 and discharged to the outside may also be increased.

In one embodiment of the present disclosure, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 µm. If the gas permeability of the lead film 400 satisfies the above range, the gas generated inside the secondary battery may be more effectively discharged.

In this specification, the gas permeability may be measured by ASTM F2476-20.

In one embodiment of the present disclosure, the moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

In one embodiment of the present disclosure, the lead film 400 may have a gas permeability of 20 Barrer to 60 Barrer at 60° C. and a moisture penetration amount of 0.02 g to 0.2 g at 25° C., 50% RH for 10 years. If the gas permeability and the moisture penetration amount of the lead film 400 satisfy the above ranges, the penetration of moisture from the outside may be more effectively prevented while discharging the gas generated inside the secondary battery.

The moisture penetration amount of the lead film 400 may be measured by adopting the ASTM F 1249 method. At this time, the moisture penetration amount may be measured using equipment officially certified by MCOON.

In one embodiment of the present disclosure, the lead film 400 may include a polyolefin-based resin. For example, the lead film 400 may include a polyolefin-based resin satisfying the gas permeability and/or moisture penetration amount values described above. The polyolefin-based resin may include at least one material selected from the group consisting of polypropylene, polyethylene, and polyvinyl difluoride (PVDF). While the lead film 400 contains polypropylene, the gas permeability of the lead film 400 may be 20 Barrer to 60 Barrer at 60° C. Also, the moisture penetration amount may be 0.06 g to 0.15 g. In this case, the gas generated inside the secondary battery may be more effectively discharged, and the penetration of moisture from the outside may be easily prevented.

In addition, since the lead film 400 is made of the above-described material, the lead film 400 may maintain the airtightness of the battery cell 100 and prevent leakage of the internal electrolytic solution.

As an example, the dented portion 450 may be partially expanded toward the upper and lower sides as compared with FIG. 9 by the gas inside the battery cell 100. However, in this embodiment, since the dented portion 450 is opened to the outside, the degree of expansion may be relatively small, and the deformation of the components may also be small accordingly.

A battery module according to another embodiment of the present disclosure includes the battery cell described above.

Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

Although the preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

What is claimed is:

1. A battery cell, comprising:
a battery case having an accommodation portion in which an electrode assembly is mounted, and a sealing portion at an outer periphery of the battery case, the sealing portion having a heat fusion sealed structure;
an electrode lead electrically connected to an electrode tab of the electrode assembly, the electrode lead protruding out of the battery case through the sealing portion; and
a lead film extending within the sealing portion adjacent to an upper portion and a lower portion of the electrode lead, the lead film encircling the electrode lead and adhered to the sealing portion of the battery case,
wherein the lead film has a dented portion recessed toward an inside of the battery case, the dented portion having a closed inner end adjacent to the inside of the battery case and an open outer end adjacent to an outside of the battery case, the lead film surrounding the closed inner end of the dented portion,
wherein the lead film surrounds a rear surface of the dented portion and an upper surface of the dented portion based on the protruding direction of the electrode lead, and
wherein the dented portion recessed into the lead film extends completely through the sealing portion of the battery case in an extension direction of the electrode lead.

2. The battery cell according to claim 1, wherein the lead film further comprises an inner layer covering at least one part of inner surfaces of the dented portion of the lead film.

3. The battery cell according to claim 2, wherein a material of the inner layer has a first melting point that is higher than a second melting point of a material of the lead film, and the material of the inner layer is configured to be non-reactive with an electrolytic solution.

4. The battery cell according to claim 2, wherein the inner layer contains at least one of polyolefin-based materials, fluorine-based materials or porous ceramic-based materials.

5. The battery cell according to claim 1, wherein the lead film contains a polyolefin-based material.

6. The battery cell according to claim 1, wherein the dented portion overlies the electrode lead.

7. The battery cell according to claim 1, wherein the lead film has a length in a longitudinal direction of the sealing portion greater than a width of the electrode lead in the longitudinal direction.

8. The battery cell according to claim 7, wherein the dented portion is located between an outer end of the electrode lead at the outside of the battery case and an inner end of the lead film at the inside of the battery case.

9. The battery cell according to claim 1, wherein the lead film includes a first lead film portion and a second lead film portion, the first lead film portion is located adjacent to an upper surface of the electrode lead, and the second lead film portion is located adjacent to a lower surface of the electrode lead.

10. The battery cell according to claim 9, wherein the electrode lead is located between the first lead film portion and the second lead film portion, and the first lead film portion and the second lead film portion are connected to each other at opposite sides of the electrode lead.

11. The battery cell according to claim 9, wherein the dented portion extends within at least one of the first lead film portion or the second lead film portion.

12. The battery cell according to claim 1, wherein the closed inner end of the dented portion recessed into the lead film extends beyond an inner surface of the battery case closer to the electrode assembly than an inner edge of the sealing portion.

13. The battery cell according to claim 12, wherein the open outer end of the dented portion extends beyond an outer surface of the battery case and is farther from the electrode assembly than an outer edge of the sealing portion.

14. The battery cell according to claim 1, wherein the lead film is configured to have a moisture penetration amount of 0.02 g to 0.2 g for 10 years at 25° C., 50% RH.

15. A battery module, comprising the battery cell according to claim 1.

16. The battery cell according to claim 1, wherein the lead film is configured to receive an outflow of a gas from an interior of the battery case through the dented portion.

17. A battery cell, comprising:
a battery case having an accommodation portion in which an electrode assembly is mounted, and a sealing portion at an outer periphery of the battery case, the sealing portion having a heat fusion sealed structure;
an electrode lead electrically connected to an electrode tab of the electrode assembly, the electrode lead protruding out of the battery case through the sealing portion; and
a lead film extending within the sealing portion adjacent to at least one of an upper portion or a lower portion of the electrode lead,
wherein the lead film has a dented portion recessed toward an inside of the battery case, the dented portion having a closed inner end adjacent to the inside of the battery case and an open outer end adjacent to an outside of the battery case,
wherein the lead film surrounds a rear surface of the dented portion and an upper surface of the dented portion based on the protruding direction of the electrode lead,
wherein the dented portion recessed into the lead film extends completely through the sealing portion of the battery case in an extension direction of the electrode lead, and
wherein the dented portion includes a first dented portion and a second dented portion, the first dented portion has a longitudinal axis extending along a protruding direction of the electrode lead, and the second dented portion has a longitudinal axis extending along a longitudinal direction of the sealing portion.

18. The battery cell according to claim 17, wherein the lead film has a width in a lateral direction of the sealing portion perpendicular to the longitudinal direction greater than a width of the sealing portion and smaller than a length of the electrode lead in the lateral direction.

19. The battery cell according to claim 18, wherein the second dented portion is located between an inner end of the sealing portion adjacent to the inside of the battery case and an inner end of the lead film adjacent to the inside of the battery case.

20. A battery cell, comprising:
a battery case having an accommodation portion in which an electrode assembly is mounted, and a sealing portion at an outer periphery of the battery case, the sealing portion having a heat fusion sealed structure;
an electrode lead electrically connected to an electrode tab of the electrode assembly, the electrode lead protruding out of the battery case through the sealing portion; and
a lead film extending within the sealing portion adjacent to at least one of an upper portion or a lower portion of the electrode lead,
wherein the lead film has a dented portion recessed toward an inside of the battery case, the dented portion having a closed inner end adjacent to the inside of the battery case and an open outer end adjacent to an outside of the battery case,
wherein the lead film surrounds a rear surface of the dented portion and an upper surface of the dented portion based on the protruding direction of the electrode lead,
wherein the dented portion recessed into the lead film extends completely through the sealing portion of the battery case in an extension direction of the electrode lead, and
wherein the lead film has a gas permeability of 20 Barrer to 60 Barrer at 60° C.

* * * * *